United States Patent [19]
Tessier et al.

[11] Patent Number: 5,146,336
[45] Date of Patent: Sep. 8, 1992

[54] SYNC CONTROL FOR VIDEO OVERLAY

[75] Inventors: Alain Tessier, Piedmont; Jean P. Champagne, Brossard; Maurice Milot, Anjou; Albert Belanger, St-Philippe de Laprairie; Yves Tardif, Montreal, all of Canada

[73] Assignee: Le Groupe Videotron LTEE, Montreal, Canada

[21] Appl. No.: 582,356

[22] Filed: Sep. 14, 1990

[30] Foreign Application Priority Data

Sep. 25, 1989 [CA] Canada .................................. 612741

[51] Int. Cl.⁵ .......................................... H04N 5/262
[52] U.S. Cl. ..................................... 358/183; 358/148
[58] Field of Search ............... 358/183, 148, 149, 151, 358/142, 17, 19, 85, 185

[56] References Cited

U.S. PATENT DOCUMENTS 4,639,765 1/1987 D'Hont ........................... 358/149 X
4,992,872 2/1991 Hartmann et al. .................. 358/148

Primary Examiner—Victor R. Kostak
Attorney, Agent, or Firm—Antonelli, Terry, Stout & Kraus

[57] ABSTRACT

A video sync control circuit for controlling the stable synchronization of the display of locally generated signals on a TV screen in the presence or in the absence of a received signal which includes a sync signal. The circuit is comprised of apparatus for receiving an video input signal, apparatus for detecting the presence of an input sync signal which is part of the video input signal, and the absence of the sync signal during all or part of a sync interval of the video input signal, apparatus for locally generating a replacement video signal containing a video display which extends over a predetermined time interval, which is in sync with a local clock, apparatus for phase locking the local clock with the input sync signal, and apparatus for switching the input video signal to an output line during time other than during the time interval, and switching the replacement composite video signal to the output line during the time interval.

9 Claims, 1 Drawing Sheet

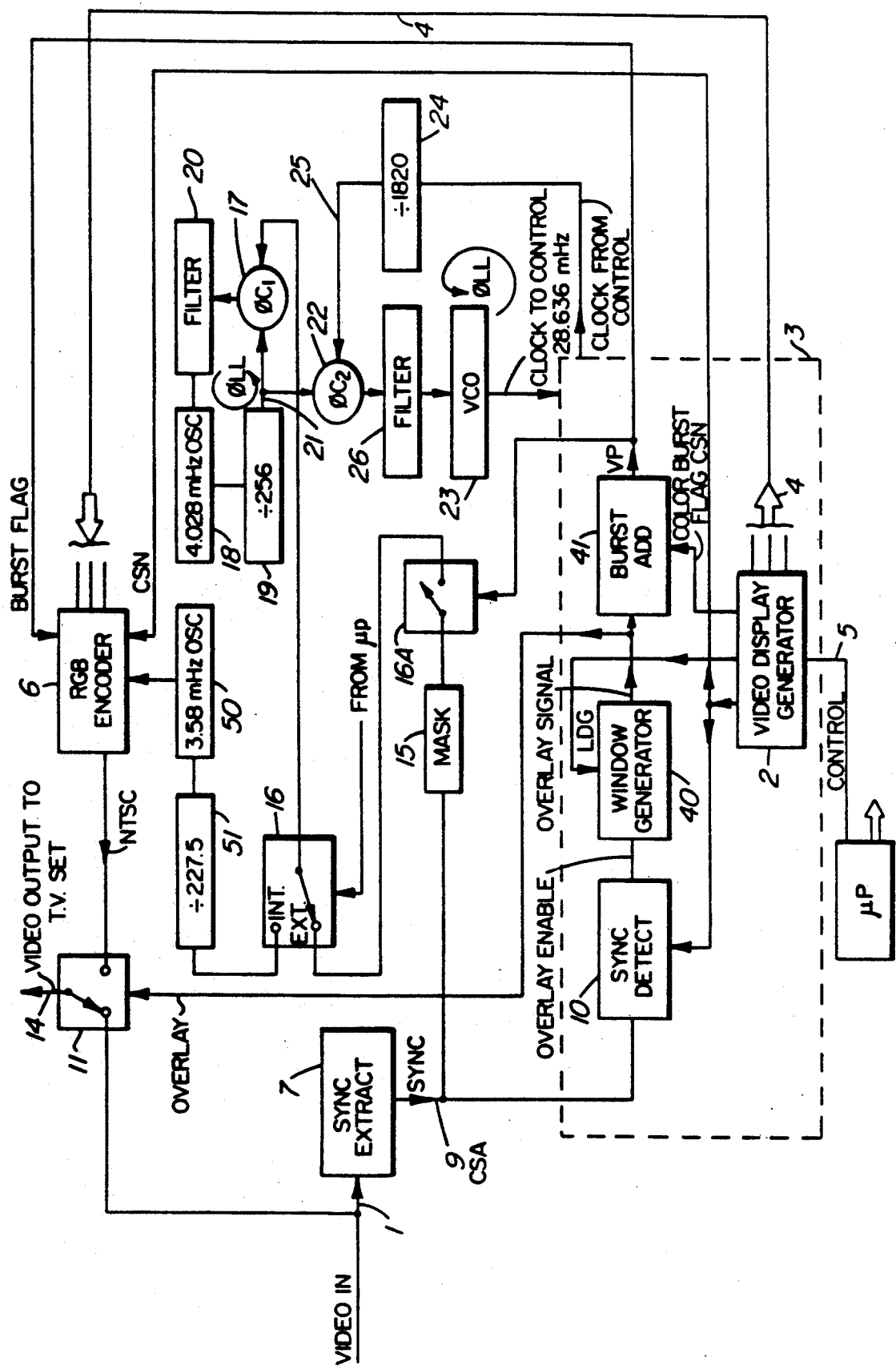

SYNC CONTROL FOR VIDEO OVERLAY

FIELD OF THE INVENTION

This invention relates to video control circuitry and in particular to a circuit for controlling the synchronization of the display of signals designating time, channel number, etc. within a picture formed from received video signals or an otherwise non-viewable picture formed from signals containing no sync or suppressed sync pulses, or within a display of a scrambled picture or noise (snow).

BACKGROUND OF THE INVENTION

Many television sets or television signal converters can be enabled to insert a display such as time, channel number, etc. (referred to herein as an insert signal) into a received video picture. The synchronization of such inserted signals with the sync pulses of the received video picture must be carefully controlled. Circuits to perform this function normally operate satisactorily in the presence of a received composite video signal. However where a composite video signal is absent, such as on an unused channel or if the video signal transmitter has gone off the air, or on a pay TV channel containing video with suppressed or absent sync pulses or which is otherwise scrambled, there is no incoming sync signal to control the placement of the inserted time, channel number, etc. on the screen. The result is typically an insert signal appearing on the TV screen which contains objectionable amounts of jitter.

Where a cable converter interfaces a television set with e.g. a CATV system, which converter is under control from the CATV head end system, sometimes insert digital signals or insert control signals are transmitted on a spare channel, and the insert signals are intended to be viewed alternatively on a channel on which there is or is no incoming video signal. In the latter case it is very important that the displayed insert (foreground) signal should not contain jitter. It is also desirable in such cases that a stable colour background should be visible to the television viewer.

SUMMARY OF THE INVENTION

The present invention is a circuit which controls the provision of insert signals with precision, so that they may be viewed on a television set with absolute stability even on an unused channel in which there are no received sync pulses.

An embodiment of the present invention is a video sync control circuit comprising apparatus for receiving a video input signal, apparatus for detecting the presence of an input sync signal which is part of the video input signal, and the absence of the sync signal during all or part of a sync interval of the video input signal, apparatus for locally generating a replacement video signal containing a video display which extends over a predetermined time interval, which is in sync with a local clock, apparatus means for phase locking the local clock with the input sync signal, apparatus for switching the input video signal to an output line during time intervals other than during the time interval, and switching the replacement composite video signal to the output line during the time interval.

Another embodiment of the invention adds to the above embodiment further by including apparatus for locally generating a sync signal, apparatus for phase-locking the local clock with the locally generated sync signal, apparatus for generating a sync absent signal upon the detection of the absence of the sync signal as part of the input video signal, apparatus for generating a window signal in the presence of and for the period of the sync absent signal, and apparatus for switching the replacement composite video signal to the output line during the interval of the window signal.

Another embodiment of the invention adds to the above embodiment further by including apparatus for locally generating a sync signal, apparatus for phase locking the local clock with the locally generated sync signal, and apparatus for switching the replacement composite video signal to the output line during the interval of the window signal.

As a result, an insert signal is viewable on a TV screen in the presence of a strong external video signal, or in the presence of an external video signal having suppressed, weak or otherwise absent or poor sync pulses, or in the absence of an external video signal altogether, with absolute stability.

BRIEF INTRODUCTION TO THE DRAWING

An better understanding of the invention will be obtained by reference to the detailed description below, with reference to the accompanying drawing, which is a block diagram of an overlay control circuit, in accordance with the preferred embodiment of the invention.

DESCRIPTION OF THE PREFERRED EMBODIMENT

There are two sources of video signals input to the circuit, one being an input line 1 carrying composite video input signals as e.g. received from a tuner in a CATV controller-converter, and for example constitute NTSC composite video signals. The second source of video signals is a video display generator 2 which is contained within a controller circuit 3. Signals to cause displays such as channel numbers, time, game signals, etc. are generated in the video display generator in a well known manner in RGB format, and are provided on an RGB bus 4. The particular signals generated by the video display generator are under control of video control signal applied to the video display generator on video control line 5. The manner of providing the control is not part of the present invention, but suffice to say that a local microprocessor can generate the control signals in response to signals stored in a local memory, initially deposited there from e.g. a CATV system head end, or enabled or incremented therefrom, as described in U.S. patent application 262,802 filed Oct. 21, 1988, invented by Michel Dufresne et al.

The RGB signals are applied to an RGB encoder 6 from bus 4 where they are combined with sync and color burst signals having carefully controlled timing, to form the signal able to be received by a local TV set or monitor, e.g. an NTSC signal. These signals constitute the "insert" signals to be inserted into a picture or noise display in a stable manner, as noted earlier.

The analog video signals on line 1 are applied to a switch 11 with the insert signals. Switch 11 is under control of controller 3, which will be described below to switch at each pixel time either the video signal from line 1 or the insert signal, to an output line 12 for display on a video monitor or to be modulated and displayed on a TV set. In this manner time, channel information, messages, etc. can be substituted in place of parts of a video signal incoming from the cable or other primary video signal source or displayed on the TV screen at predetermined locations in place of noise, scrambled picture, etc.

It should of course be recognized that switch 11 is capable of switching any video signal in place of the primary video input signal at controlled times on output line 12. In this respect it can be used to display a picture-within-a-picture, several pictures-within-a-picture, screen wipes, or other effects, and not only alphanumeric characters which may be provided by the video display generator under control of a local microprocessor controlling switch 11. Indeed switch 11 can be a multi-input switch which can switch between various plural video signal sources. By the use of the present invention at least one of those video signal sources can contain no sync pulses, e.g. can be only noise.

There are two modes of operation of the present invention. Mode 1 exists when the external video signal is present and is to be used, and when the associated sync signal is strong. Mode 2 exists when no or poor incoming sync is present, and a totally new sync signal is locally generated and used. This will occur for example when a pay TV signal is being received, in which the sync is suppressed or does not exist. It also exists when a video display generator generated signal is to be displayed, and is to be combined with locally generated (i.e. interval) sync, or when there is no incoming video signal at all, such as when an unused channel is being watched, and consists of noise, and sync is to be locally generated and used.

In order to provide locally generated sync to the output 14, switch 11 is switched to receive the internally generated composite video signal, the insert signal, during the sync interval. The switching control signal for switch 11 is a signal referred to herein as an "overlay" signal.

The video input signals on input line 1 are comprised of analog video information components, sync including equalization pulses and colour burst signals. These video signals are applied to a sync extraction or separation circuit 7, which separates the sync and equalization pulses from the remainder of the video signal and applies the resulting composite analog sync signals on line 9.

The extracted sync signal on sync line 9 is passed through an equalization pulse mask, which removes every second equalization pulse. It is desired to remove every second equalization pulse since equalization pulses are applied at a nominal frequency of 30 kHz, and it is desired to obtain pulses only at the horizontal frequency, which is nominally 15 kilohertz. The resulting sync pulses at nominally 15 kilohertz are provided to an EXT pole of switch 16, through a switch 16A.

It is desired to determine whether the sync from the input video signal is satisfactory to use, or whether it is corrupted or non-existent. If it has been corrupted, a switch 16A is opened under control of a video absent signal, as will be described later, eliminating any corrupted received equalization pulses from being applied to the EXT terminal of switch 16.

The extracted sync and equalization pulses are applied to a sync pulse detector 10 in the controller 3. If the sync detector detects a predeterined sufficient level of sync signal, it outputs no signal. However if it detects no, poor or corrupted sync, it generates the overlay signal, which is a window pulse which indicates when sync should occur, based on digital timing. The sync interval window signal is generated in the video display generator 2, and is applied to the sync detector 10 on the CSN lead. The timing of this overlay signal is of course critical, and the establishment of the timing will be described below. The overlay signal extends for the time having maximum of the sync interval window, for the time interval when there is no received sync signal. It therefore is in the form of a variable width window having maximum width (time) which is the normal sync interval. This maximum width occurs in the absence of received sync.

The structure and operation of the invention will be described below with reference to the three modes listed earlier. In the first mode, sync is detected, and therefore the sync signal of the incoming video signal is to be used. A local microprocessor, which generates signals on control lead 5, generates control signals which are applied to switch 16, which switches to receive signals on its EXT (external sync) terminal. It will be recalled that this signal is received via switch 16A and mask 15, and is a nominally 15 kHz horizontal frequency sync pulse.

The output signal of switch 16 is applied to a first phase comparator 17.

Another signal applied to phase comparator 17 is generated by a voltage controlled 4.028 mHz oscillator 18, having an output signal which is divided in a "divide by 256" divider 19.

The output signal from phase comparator 17 is a DC error signal which is filtered in filter 20, the resulting DC signal being applied to the voltage control input control of oscillator 18. It may be seen that phase comparator 17 with filter 20, oscillator 18 and divider 19 form a phase locked loop. It is preferred that oscillator 18 should be a ceramic oscillator in order to provide a wide capture ratio.

The divided 4.028 mHz oscillator signal is 15,731 Hz (nominally 15 kHz, the horizontal sync frequency). Thus it may be seen that the phase locked loop is locked to the sync pulse frequency of the video input signal appearing on input line 1. The signal appearing on the H sync lead 21 at the output of the divider 19 has a horizontal phase locked frequency devoid of jitter, and in sync with the sync pulses from the original video input signal on input line 1.

The horizontal sync locked signal on lead 21 is applied to one input of a second phase comparator 22. A second voltage control oscillator 23 generates signals at 8 times the colour burst signal, e.g. 28.636 mHz. The signal is applied on the clock input to controller 3, and controls the timing of the video display generator 2.

The clock signal from the controller 3 is also divided by a "divide by 1820" divider 24, which yields a signal which is at the horizontal sync frequency 15,731 Hz. That signal is applied on lead 25 to the voltage control input of phase comparator 22. With the phases of the signals on leads 21 and 25 compared, the output signal of phase comparator 22 is a DC error signal which is filtered in filter 26 and is applied to voltage controlled oscillator 23, to control its frequency. It may be seen that phase comparator 22, filter 26, oscillator 23 and divider 24 form a second phase locked loop.

The output signal of oscillator 23 which is 28.636 mHz, used as a system clock, locks the sync signals of the video display generator generated signals to the sync signals of the input video signal. Further, the signal on lead 25 which at 15,731 Hz is at the horizontal sync frequency and is locked to the system frequency in a very stable manner. While horizontal sync signals are not needed in mode 1, they are used in modes 2 and 3. The 28.636 mHz frequency is at the colour burst frequency. Thus signals at both the horizontal frequency and colour burst frequency are generated, locked together, and are in sync with the horizontal sync signal of the original video input signal on input line 1. The generated sync and colour burst signals are highly stable and devoid of jitter.

The latter two signals are applied to RGB encoder 6, where they are added to the RGB signal generated in the video display generator to form a composite NTSC signal, for application to a TV set via switch 11 as described earlier. By switch 11 switching between the input video signal and the composite generated insert signal, the output signal to the TV set on line 14 is comprised of highly stable sync and colour burst signals combined with generated RGB signals replacing analog signal video at appropriate times as described by a local processor controlling switch 11.

In the case in which the input video signals on lead 1 are absent, such as on a vacant channel in which there is no TV signal being transmitted, or in the case of receipt of a video signal having weak or inverted sync pulses or sync pulses removed, such as on a pay TV channel, there will be no corrupted or sync signals which can be extracted by sync extraction circuit 7. Sync detector 10 detects the absence of sync pulses, and in response causes an overlay enable (sync absent) signal to be applied to a window generator 40. Window generator 40 receives an signal (LDG) from the video display generator 2, which is a window pulse surrounding the time of the normal sync interval and the color burst as described earlier. Comparing the timing of the sync absent signal and the LDG signal provides the overlay signal, which as described earlier is a pulse of variable width, that extends during the time period of the maximum sync interval over the period of absent sync, as designated by the sync absent signal. In other words, the overlay pulse indicates the interval when external sync should be replaced by internal sync.

The overlay signal is applied to the control input of switch 11. During the time of the overlay signal, the switch 11 is caused to receive the internally generated composite signal from encoder 6 which during the interval, will be generating sync signals.

The overlay signal is also applied to an adding circuit 41, to which a color burst flag is applied where it is added to the overlay signal. The color burst flag is generated by the video display generator. The resulting overlay signal containing a color burst flag, which indicates where the color burst timing within the overlay pulse, is carried by a VP lead to the RGB encoder 6. This provides timing for the RGB encoder to insert the color burst.

Thus it may be seen that the present invention substitutes internally generated sync signals in place of absent or degraded sync signals input from the input video signals, under control of the processor acting on switch 11.

If there are no input sync signals detected at all, or it is desired to display internally generated insert signals complete with sync signals and the microprocessor operates switch 16 to switch it into internal mode. The switch 16 is thus connected to the INT terminal.

In this case, a local 3.58 mHz oscillator 50 provides a signal which is divided in a 227.5 divider 51, and the resulting nominally 15 kHz signal is applied via the INT terminal of switch 16 to phase comparator 17. It will be seen that this signal substitutes for the received, extracted synchronization pulses from the video input signal, which had been applied via switch 16A and the EXT terminal of switch 16, in the mode of operation described earlier. The 3.58 mHz signal is applied to RGB encoder 6 as a local clock.

When there is no sync detected in sync detector 10, an absent sync signal is applied to window generator 40 which generates an overlay signal extending over the entire sync and color burst time. This overlay signal applied to switch 11 causes switch 11 to switch to the internally generated NTSC insert signal terminal. The two phase locked loops operate as described earlier, phase locking them to the 3.58 mHz oscillator 50, as well locking the clock of controller 3 and video display generator 2, in the manner described above earlier.

Switch 11 is switched to receive the locally generated composite video by means of the local microprocessor during the interval when a picture insert is to be substituted for what is displayed on the screen, be it analog video input signals, undecoded pay TV signals, noise (snow), etc. The locally generated insert signal is completely stable and devoid of jitter, which would otherwise not be the case in the prior art should a local video generated insert video signal be inserted in place of the signals sent to the TV set when there are no or poor input video sync signals which could be used as a reference.

By the use of the present invention, not only can a stable insert signal be provided to the CATV subscriber generated in a controller-converter interfacing his TV set with a CATV system, but the system head end controller can provide services not previously possible. For example, where the channel controller-converter is controlled from the head end, the controller-converter can be locked to an unused channel containing noise, and a stable overlay message displayed to the subscriber as generated in the video display generator advising the subscriber for example that he is in arrears of payment and will not be provided with service.

Persons skilled in the art understanding this invention will recognize that it can be adapted to be used with other types of television systems, such as PAL, SECAM, etc. Accordingly, the description and claims herein should be construed not to be restricted to the NTSC system. For example the frequencies of horizontal sync, vertical sync, color burst, etc, can be varied to the type of system used, while still using the principles of the invention described and defined herein.

Numerous other applications and other embodiments may now occur to a person skilled in the art understanding this invention. All such modifications and embodiments falling within the scope of the claims are considered to be part of the present invention.

We claim:

1. A video sync control circuit comprising:
   (a) means for receiving an video input signal,
   (b) means for detecting the presence of an input sync signal which is part of the video input signal, and the absence of said sync signal during all or part of a sync interval of said video input signal,
   (c) means for locally generating a replacement video signal containing a video display which extends over a predetermined time interval, which is in sync with a local clock,
   (d) means for phase locking the local clock with the input sync signal, (e) means for switching the input video signal to an output line during time other than during said time interval, and switching the replacement composite video signal to the output line during said time interval.

2. A control circuit as defined in claim 1, further including means for locally generating a sync signal, means for phase-locking the local clock with the locally generated sync signal, means for generating a sync absent signal upon the detection of the absence of said sync signal as part of the input video signal, means for generating a window signal in the presence of and for the period of the sync absent signal, and means for switching the replacement composite video signal to the output line during the interval of the window signal.

3. A control circuit as defined in claim 2, further including means for locally generating a sync signal, means for phase locking the local clock with the locally generated sync signal, and means for switching the replacement composite video signal to the output line during the interval of the window signal.

4. A control circuit as defined in claim 1 in which the means for phase locking the local clock is comprised of first and second phase locked loops, means for applying every second equalization pulse of the input sync signal to the first phase locked loop to synchronize the first phase locked loop therewith and to form a loop signal which is a stable horizontal sync frequency signal, the second phase locked loop being coupled to the first phase locked loop for receiving the stable horizontal sync frequency signal as an input thereto, means for applying a clock signal from the local replacement video signal generating means to the second phase locked loop for synchronizing the clock signal to the stable horizontal sync frequency signal, and means for supplying the synchronized clock signal to the local replacement video signal generating means, whereby the local replacement video signal generating means clock is synchronized to the input sync signal.

5. A control circuit as defined in claim 3, in which the means for phase locking the local clock is comprised of first and second phase locked loops, means for applying the locally generated sync signal to the first phase locked loop to synchronize the first phase locked loop therewith and to form a loop signal which is a stable horizontal sync frequency signal, the second phase locked loop being coupled to the first phase locked loop for receiving the stable horizontal sync frequency signal as an input thereto, means for applying a clock signal from the local replacement video signal generating means to the second phase locked loop for synchronizing the clock signal to the stable horizontal sync frequency signal, and means for supplying the synchronized clock signal to the local replacement video signal generating means, whereby the local replacement video signal generating means clock is synchronized to the locally generated sync signal.

6. A circuit as defined in claim 4 in which the second phase locked loop is comprised of a voltage controlled oscillator operating at a frequency of 8 times a standard NTSC colour burst frequency, and a divider connected in series therewith having a division parameter of 1820, the output of the divider being connected to an input of a phase comparator, the output of the phase comparator being connected to a control input of the voltage controlled oscillator, an output signal of the first phase locked loop at an NTSC horizontal sync frequency being connected to another input of the phase comparator, the output signal of the divider being provided as the stable horizontal sync signal and the output signal of the voltage controlled oscillator being provided as the clock signal.

7. A circuit as defined in claim 4 in which the second phase locked loop is comprised of a voltage controlled oscillator operating at a frequency of a multiple of a standard television system colour burst frequency, and a divider connected in series therewith having a division parameter such as to produce an output signal of the divider which is a standard horizontal frequency of the television system, the output signal of the divider being connected to an input of a phase comparator, the output of the phase comparator being connected to a control input of the voltage controlled oscillator, an output signal of the first phase locked loop at a horizontal sync frequency of said television system being connected to another input of the phase comparator, the output signal of the divider being provided as the stable horizontal sync signal and the output signal of the voltage controlled oscillator being provided as the clock signal.

8. A circuit as defined in claim 5 in which the second phase locked loop is comprised of a voltage controlled oscillator operating at a frequency of 8 times a standard NTSC colour burst frequency, and a divider connected in series therewith having a division parameter of 1820, the output of the divider being connected to an input of a phase comparator, the output of the phase comparator being connected to a control input of the voltage controlled oscillator, an output signal of the first phase locked loop at an NTSC horizontal sync frequency being connected to another input of the phase comparator, the output signal of the divider being provided as the stable horizontal sync signal and the output signal of the voltage controlled oscillator being provided as the clock signal.

9. A circuit as defined in claim 5 in which the second phase locked loop is comprised of a voltage controlled oscillator operating at a frequency of a multiple of a standard television system colour burst frequency, and a divider connected in series therewith having a division parameter such as to produce an output signal of the divider which is a standard horizontal frequency of the television system, the output signal of the divider being connected to an input of a phase comparator, the output of the phase comparator being connected to a control input of the voltage controlled oscillator, an output signal of the first phase locked loop at an horizontal sync frequency of said television system being connected to another input of the phase comparator, the output signal of the divider being provided as the stable horizontal sync signal and the output signal of the voltage controlled oscillator being provided a the clock signal.

* * * * *